United States Patent [19]

Lange

[11] Patent Number: 4,640,902
[45] Date of Patent: Feb. 3, 1987

[54] LOW THERMAL CONDUCTIVITY $Si_3N_4/ZrO_2$ COMPOSITE CERAMICS

[75] Inventor: Fred F. Lange, Thousand Oaks, Calif.

[73] Assignee: Rockwell International Corporation, El Segundo, Calif.

[21] Appl. No.: 739,807

[22] Filed: May 31, 1985

[51] Int. Cl.⁴ .............................................. C04B 35/58
[52] U.S. Cl. ........................................ 501/97; 264/60; 501/98; 501/103; 501/104; 501/105
[58] Field of Search ............................ 501/97, 98, 105

[56] References Cited

U.S. PATENT DOCUMENTS

| | | | |
|---|---|---|---|
| 4,304,576 | 12/1981 | Hattori et al. | 501/97 |
| 4,316,964 | 2/1982 | Lange | 501/105 |
| 4,506,024 | 3/1985 | Claussen et al. | 501/105 |
| 4,511,525 | 4/1985 | Tsuge et al. | 501/97 |
| 4,525,464 | 6/1985 | Claussen et al. | 264/60 |

FOREIGN PATENT DOCUMENTS

| | | | |
|---|---|---|---|
| 117936 | 9/1984 | European Pat. Off. | 501/97 |
| 57-205374 | 12/1982 | Japan . | |
| 59-131579 | 7/1984 | Japan | 501/97 |
| 59-152254 | 8/1984 | Japan | 501/97 |

OTHER PUBLICATIONS

Stevens, R., "An Introduction to Zirconia" pub. by Magnesium Elektron Ltd., England, Jun. '83, p. 7.
Levin, E. M. et al., Phase Diagrams for Ceramists, 1975, Figure 4452, ($ZrO_2$—$TiO_2$).

*Primary Examiner*—Helen M. McCarthy
*Attorney, Agent, or Firm*—H. Fredrick Hamann; Craig O. Malin; Max Geldin

[57] ABSTRACT

Improved $Si_3N_4/ZrO_2$ composite ceramics are described, having low thermal conductivity and which are substantially free of surface spalling and material degradation. Such composites are produced by incorporating an additive, e.g. MgO, CaO or $Y_2O_3$, preferably $Y_2O_3$, in suitable molar proportions based on $ZrO_2$, and sintering the mixture with $Si_3N_4$. In a preferred embodiment a powder mixture of 70% $Si_3N_4$ and 30% $ZrO_2$, by volume, and containing 6.6 mole percent $Y_2O_3$ based on $ZrO_2$, is formed and is sintered to produce a composite ceramic. The $Y_2O_3$ is preferably pre-reacted with the $ZrO_2$ to form a solid solution. A sintering aid, preferably $Al_2O_3$, e.g. in an amount of about 2 to about 4%, by weight of the total mixture, can be added to permit production of the $Si_3N_4/ZrO_2$ composite by pressureless sintering.

18 Claims, 1 Drawing Figure

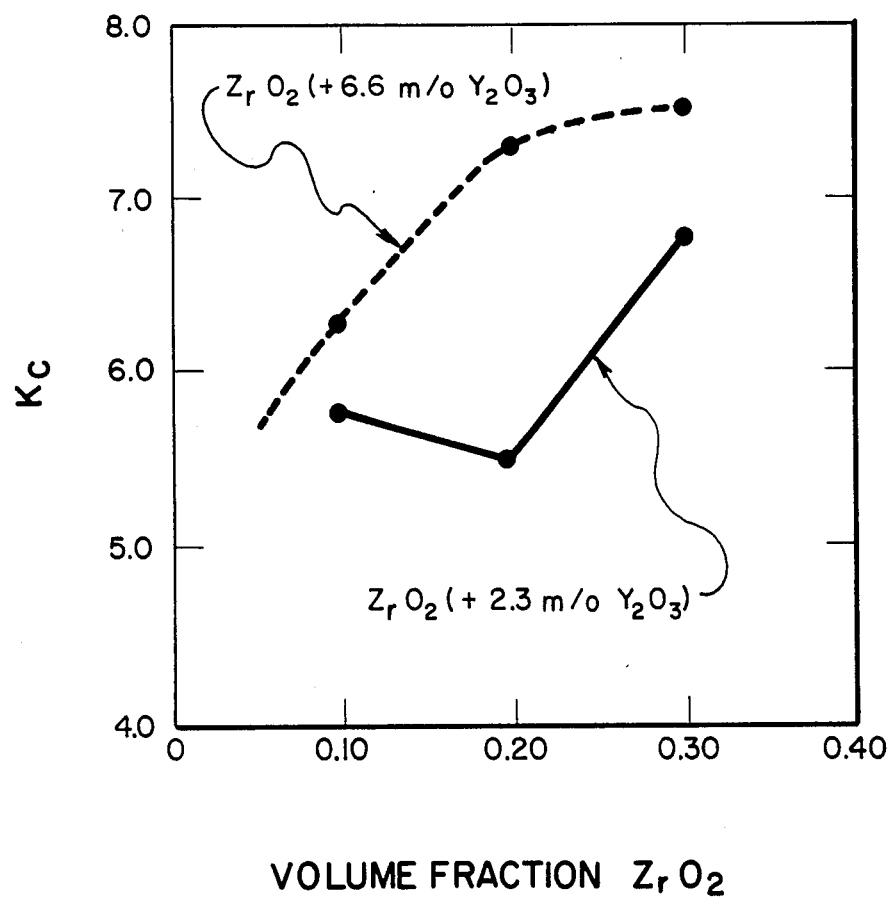

LOW THERMAL CONDUCTIVITY SI$_3$N$_4$/ZRO$_2$ COMPOSITE CERAMICS

BACKGROUND OF THE INVENTION

1. Field of the Invention

This invention relates to the field of ceramics, and particularly to the field of low thermal conductivity Si$_3$N$_4$/ZrO$_2$ ceramics.

2. Description of the Prior Art

Many different silicon nitride, Si$_3$N$_4$, compositions have been investigated. One of these is the composition produced by the addition of zirconium oxide, ZrO$_2$, to Si$_3$N$_4$, to form Si$_3$N$_4$/ZrO$_2$ composites. The Si$_3$N$_4$ is a low expanding material, that is it has a low thermal expansion coefficient but relatively high thermal conductivity. ZrO$_2$ has a relatively high thermal expansion coefficient but low thermal conductivity. However, when ZrO$_2$ is added to Si$_3$N$_4$, the thermal conductivity of the Si$_3$N$_4$ is dramatically reduced, while the thermal expansion thereof is increased only to a moderate degree. The resulting Si$_3$N$_4$/ZrO$_2$ composite ceramics are accordingly useful in those applications requiring a ceramic having a relatively low thermal expansion coefficient and thermal shock resistance of Si$_3$N$_4$ materials, yet also having a low thermal conductivity. These applications include use in adiabatic Diesel engine components and radomes.

However, during fabrication of such Si$_3$N$_4$/ZrO$_2$ composites by sintering at high temperatures, Zr-oxynitride is formed, which readily oxidizes at temperatures between 500° C. and 1000° C. to form monoclinic ZrO$_2$ as a reaction product on the surface of the composite. The large molar volume change associated with this oxidation reaction produces large surface compressive stresses which causes surface spalling and rapid material degradation, particularly when the initial volume percent of the ZrO$_2$ in admixture with the Si$_3$N$_4$, exceeds about 10%.

SUMMARY OF THE INVENTION

It is an object of the present invention to provide improved low thermal conductivity Si$_3$N$_4$/ZrO$_2$ composite ceramics.

Another object of the invention is the production of Si$_3$N$_4$/ZrO$_2$ composites which are substantially free of zirconium oxynitride.

Yet another object is the provision of Si$_3$N$_4$/ZrO$_2$ ceramics having low thermal conductivity and which are substantially free of surface spalling.

A still further object of the invention is to provide Si$_3$N$_4$/ZrO$_2$ composites containing a toughening agent to improve the strength, toughness and fracture resistance of such composites.

An additional object is the provision of procedure for producing such improved Si$_3$N$_4$/ZrO$_2$ composites.

According to the invention, it has been found that by incorporating Y$_2$O$_3$, or equivalent substances as described below, as additive to the ZrO$_2$, in admixture with Si$_3$N$_4$, the formation of Zr-oxynitride in the sintered Si$_3$N$_4$/ZrO$_2$ composite is avoided, when a sufficient amount of the additive is employed.

The additive, e.g. Y$_2$O$_3$, MgO or CaO, preferably Y$_2$O$_3$, alloys with the ZrO$_2$ and forms a ZrO$_2$ solid solution, resulting in the formation of either the tetragonal or cubic structure of ZrO$_2$, substantially without formation of zirconium oxynitride. Thus, upon oxidation, the additive cation, e.g. the cation Y, will remain with the ZrO$_2$, in solid solution therein, to stabilize the tetragonal and/or cubic ZrO$_2$ structure and thus prevent the formation of Zr-oxynitride and monoclinic ZrO$_2$, with its associated high molar volume change. The tetragonal or cubic ZrO$_2$ structure or both, are formed within the composite mass regardless as to any oxidation which may take place at the surface of the composite.

The result of the incorporation of the additive, particularly Y$_2$O$_3$, into the ZrO$_2$ component to form a ZrO$_2$ solid solution therewith, prior to reaction with Si$_3$N$_4$, is the provision of Si$_3$N$_4$/ZrO$_2$ composite ceramics having low thermal conductivity and which are free of surface spalling, and having increased fracture toughness and improved high temperature mechanical characteristics.

BRIEF DESCRIPTION OF THE DRAWING

The drawing shows a plot of volume fraction of the ZrO$_2$ component of the Si$_3$N$_4$/ZrO$_2$ mixture, against the value $K_c$, corresponding to resistance to crack extension or fracture toughness of the ceramic, for two different molar proportions of the additive Y$_2$O$_3$ with respect to the ZrO$_2$ component.

DETAILED DESCRIPTION OF PREFERRED EMBODIMENTS

The Si$_3$N$_4$ and ZrO$_2$ are mixed in proportions which can range from about 5 to about 95% of Si$_3$N$_4$, and about 95 to about 5% of ZrO$_2$, by volume (v/o). In preferred practice a range of about 50 to about 90% Si$_3$N$_4$ and about 10 to about 50% ZrO$_2$, by volume, is employed.

The additive employed as alloying agent to ZrO$_2$, is preferably Y$_2$O$_3$. However, equivalent additives for the purpose of the invention can be employed, including particularly MgO or CaO. Other additives which can be employed, include TiO$_2$ and the oxides of the rare earth elements 58 to 71 of the periodic table, such as Ce, Pr, Nd, Pm, Sm, Eu, Gd, Dy and Tm. Mixtures of the above mentioned alloying additives can also be utilized. It has been found that Y$_2$O$_3$ is particularly advantageous, and the invention is described herein primarily in relation to such preferred additive. However, any metal oxide capable of alloying with ZrO$_2$, and which when reacted or sintered with Si$_3$N$_4$, results in the formation of Si$_3$N$_4$/ZrO$_2$ composites free of Zr-oxynitride, and having low thermal conductivity and enhanced fracture toughness and resistance to spalling, can be employed.

The amount of additive incorporated with the ZrO$_2$ is an amount sufficient to prevent formation of Zr-oxynitride. Where the preferred additive Y$_2$O$_3$ is employed, this additive is employed in an amount ranging from about 3 to about 15, preferably about 3 to about 7, mole % (m/o), based on ZrO$_2$. An optimum amount is about 6 to about 7 m/o Y$_2$O$_3$ and about 93 to about 94 m/o ZrO$_2$.

Other ZrO$_2$ alloying additives are generally employed in amounts different from Y$_2$O$_3$, in order to prevent formation of Zr-oxynitride. Thus, cerium oxide (Ce$_2$O$_3$) is employed in an amount which can range from about 9 to about 20 m/o, to 91-80 m/o of ZrO$_2$. The alkaline earth oxide type additives such as MgO and CaO can be employed in an amount ranging from about 5 to about 12 m/o, with respect to, i.e. based on, ZrO$_2$. TiO$_2$ can be employed in an amount ranging from about 15 to about 35 m/o, based on ZrO$_2$.

In preferred practice, the $Y_2O_3$ or other additive, e.g. MgO or CaO, in suitable proportions, is pre-reacted with the $ZrO_2$ and alloys therewith to form a solid solution. Such $ZrO_2$-additive, e.g. $ZrO_2$-$Y_2O_3$, solid solution in powder form is then mixed and reacted with $Si_3N_4$ powder. It has been found that the initial formation of a solid solution of $ZrO_2$ with additive, such as $Y_2O_3$, provides a highly homogeneous mixture of the $ZrO_2$ and additive, which when reacted or sintered with the $Si_3N_4$ powder, facilitates the reaction to form the desired tetragonal $ZrO_2$ structure in the composite. However, if desired, the additive, e.g. $Y_2O_3$, need not be pre-reacted or pre-alloyed with the $ZrO_2$, and separate physical mixtures of the $ZrO_2$ and additive powder, in suitable proportions as noted above, can be mixed and reacted with the $Si_3N_4$ powder.

The mixture of $Si_3N_4$ and pre-alloyed $ZrO_2$ containing additive, preferably $Y_2O_3$, or the mixture of the three separate components $Si_3N_4$, $ZrO_2$ and additive, can be sintered and hot pressed to produce the improved composite ceramics according to the invention. However, in order to permit production of a dense $Si_3N_4/ZrO_2$ ceramic body containing additive, e.g. $Y_2O_3$, of the invention, by pressureless sintering, it is necessary to incorporate a sintering aid into the particulate mixture of $Si_3N_4$ and $ZrO_2$ containing $Y_2O_3$. A preferred sintering aid for this purpose is $Al_2O_3$. However, other metal oxides such as MgO, CaO, $TiO_2$ or cerium oxide can be employed for this purpose. When one of such other oxides is employed as additive for $ZrO_2$ as noted above, in place of $Y_2O_3$, such other oxide, e.g. MgO or CaO, can function both as $ZrO_2$ additive and also as sintering aid.

The amount of sintering aid employed is sufficient to permit pressureless sintering of the mixture of $Si_3N_4$, $ZrO_2$ and additive, such as $Y_2O_3$, separately or prealloyed with the $ZrO_2$. Where $Al_2O_3$ is used as sintering aid, it is employed in an amount ranging from about 1 to about 8%, by weight, (w/o), preferably about 2 to about 4 w/o, of the total mixture. MgO or CaO can be employed as sintering aid in the same proportions as $Al_2O_3$, e.g. in conjunction with $Y_2O_3$ as additive. The presence of a sintering aid such as $Al_2O_3$ has essentially no adverse affect on the function of the $ZrO_2$ additive, e.g. $Y_2O_3$, in production of $Si_3N_4/ZrO_2$ composites having the improved properties noted above.

In producing the low thermal conductivity $Si_3N_4/ZrO_2$ composite ceramics of the invention, each of the $Si_3N_4$, $ZrO_2$ containing additive or alloying component, preferably $Y_2O_3$ additive, and sintering aid, where employed, such as $Al_2O_3$, in powder form is first dispersed in water at a pH required to produce a good dispersion. Alternatively, separate dispersions of the $ZrO_2$ and additive, e.g. $Y_2O_3$, can be employed. Colloidal techniques are used to disperse, deagglomerate, mix and consolidate the powders. The respective dispersed powders are separately sedimented by conventional techniques such as centrifuging to eliminate relatively large particles and agglomerates. The respective suspensions can then be flocced by a change in pH, to prevent mass segregation, e.g. during storage.

Mixing of the individual flocced suspensions is then carried out, e.g. at a high shear rate, with a high speed blender, to obtain a uniform multiphase, e.g. three phase, aqueous dispersion containing the proper amount of particulate component in each phase. The multiphase aqueous dispersion of all of the powder components is then filtered as by slip casting, and then dried, either at ambient temperature or elevated temperature of about 30° to about 90° C. The dried composite powder mixture is then sintered at suitable elevated temperature, e.g. 1600° C. to about 1800° C., to produce the invention composite. Sintering can be carried out in an air furnace in which a $Si_3N_4$ packing powder can be used as an oxygen getter. Alternatively, the sintering can be carried out in a controlled atmosphere furnace containing a gas such as nitrogen.

The following are examples of practice of the invention, it being understood that such examples are only illustrative and are not intended as limitative of the invention.

EXAMPLE I

A composite powder containing 70 v/o $Si_3N_4$ + 30 v/o $ZrO_2$ in the form of a solid solution with 6.6 m/o $Y_2O_3$ + 2 w/o $Al_2O_3$ was produced as follows. Each of the three powders was first dispersed in water at a pH required to produce a good dispersion, the $ZrO_2$-$Y_2O_3$ dispersion at a pH of 2, the $Si_3N_4$ dispersion at a pH of 10 and the $Al_2O_3$ dispersion at a pH of 2. The pH of each of the aqueous dispersions was adjusted to the proper pH for each, noted above, by addition of an acid such as hydrochloric acid or a base such as ammonium hydroxide. However, any suitable organic or inorganic acid or base can be used for this purpose.

The three separate aqueous powder dispersions were separately sedimented under the force of gravity to eliminate particles and agglomerates greater than 1 $\mu$m. The respective powder suspensions were then flocced by changing the pH to 8 with additions of either HCl or $NH_4(OH)$ to prevent mass segregation during storage.

The three flocced suspensions were then mixed at a high shear rate to obtain a uniform three phase aqueous slurry with the proper proportions of the components noted above.

The three phase aqueous slurry was then filtered by slip casting and dried at 30° C. The composite powders were then surrounded by silicon nitride powder contained in an aluminum oxide crucible and sintered using pressureless sintering at 1700° C. for 30 minutes in an air furnace. The density of the resulting sintered composite was 3.98 gm/cc. The composite had low thermal conductivity and showed no surface spalling or degradation.

TEM (transmission electron microscopy) observations of the $ZrO_2$ type grains in the resulting $Si_3N_4/ZrO_2$ composite contained banded features which have been identified as tetragonal $ZrO_2$ by selected area diffraction and no formation of Zr-oxynitride was detected. The tetragonal structure form of $ZrO_2$ is preferred since this is considered the ideal toughening agent for this composite.

EXAMPLE II

The procedure of Example I is substantially followed, except that the $Al_2O_3$ is omitted, so that only two aqueous dispersions, namely the $Si_3N_4$ dispersion and the $ZrO_2$ containing $Y_2O_3$ dispersions are prepared and mixed to produce a two phase mixture containing 70 v/o $Si_3N_4$ and 30 v/o $ZrO_2$ including 6.6 m/o $Y_2O_3$.

The resulting mixture is then filtered and dried and the resulting composite powder is then sintered by hot press sintering at 1750° C. for 60 minutes at a pressure of 4,000 psi. A low thermal conductivity $Si_3N_4/ZrO_2$ composite free of surface spalling is obtained.

EXAMPLE III

The procedure of Example I is substantially followed except that MgO or CaO each in an amount of 10 m/o based on $ZrO_2$ is employed instead of $Y_2O_3$.

Results similar to those in Example I are obtained.

EXAMPLE IV

The procedure of Example I is substantially followed except that the $ZrO_2$ and $Y_2O_3$ are in the form of separate powders, and separate aqueous dispersions of these substances in the relative proportions noted in Example I are mixed with the aqueous dispersions of $Si_3N_4$ and $Al_2O_3$, in the proportions noted in Example I, to form a four phase aqueous dispersions of $Si_3N_4$, $ZrO_2$, $Y_2O_3$ and $Al_2O_3$, powders.

This dispersion, following processing as in Example I, results in a low thermal conductivity composite having substantially the same properties as in Example I.

EXAMPLE V

Two series of $Si_3N_4/ZrO_2$ composite ceramics each containing 10, 20 and 30 v/o of initial $ZrO_2$, pre-reacted with 2.3 m/o $Y_2O_3$ based on $ZrO_2$ in one series, and with 6.6 m/o $Y_2O_3$ based on $ZrO_2$ in the second series, and each composition containing 2 w/o $Al_2O_3$ sintering aid, were prepared substantially as described in Example I above.

Each of the two series of ceramic specimens were polished and tested on a Vickers indenter at a load of 20 kgm, to measure fracture toughness of the respective specimens.

The results obtained are illustrated in the drawing, showing a plot of the volume fraction of $ZrO_2$ in the $Si_3N_4/ZrO_2$ composite, against the value $K_c$, defined as the critical stress intensity factor, and which corresponds to a measure of resistance of the specimen to crack extension and hence fracture toughness. Thus, the higher the value of $K_c$ the greater the fracture toughness of the composite.

It is seen from the drawing that all of the second 2series of composites containing 10, 20 and 30% by volume of $ZrO_2$ including 6.6 mole % $Y_2O_3$ as additive, had substantially higher fracture toughness, as measured by the value $K_c$, as compared to the fracture toughness of the first series of composites containing the same volume fraction of $ZrO_2$, respectively, but including only 2.3 mole % $Y_2O_3$ additive. It is also noted that for the second series of composites containing 6.6 m/o $Y_2O_3$ based on $ZrO_2$, the fracture toughness as measured by the value $K_c$, increased with increase in volume fraction of $ZrO_2$ from 10 to 30 v/o of $ZrO_2$. The reason why the pre-reacted $ZrO_2$ powder containing 6.6 m/o $Y_2O_3$ produces the highest and most consistent values of $K_c$ is presently not understood.

On the other hand, composites fabricated with pure $ZrO_2$, that is containing no additive according to the invention, severely degraded (cracked into many pieces) within a short period of less than 16 hours when oxidized in an air furnace at temperatures between 500° C. and 900° C. XRD (X-ray diffraction) analysis revealed a large increase in monoclinic $ZrO_2$ after oxidation, indicating that the Zr-oxynitride formed during sintering under these conditions oxidized to monoclinic $ZrO_2$ and a large molar volume change associated with this reaction was the apparent cause of the degradation.

Compositions fabricated with pre-reacted $ZrO_2$ containing 2.3 m/o $Y_2O_3$ also degraded to some degree, but less severely, that is showing few cracks, and required longer oxidation periods for degradation. The presence of monoclinic $ZrO_2$ was observed as a minor phase, together with the tetragonal phase, after oxidation. These results indicate that composites containing 2.3 m/o $Y_2O_3$ did contain some Zr-oxynitride, which could not be discerned by x-ray diffraction. On the other hand, compositions fabricated with $ZrO_2$ containing 6.6 m/o $Y_2O_3$ as in Example I did not degrade (surface spalling) after long periods of oxidation up to 180 hours at temperatures between 600° C. and 900° C. XRD examination of oxidized specimens did not reveal monoclinic $ZrO_2$. The results indicate that Zr-oxynitride is not present in the $Si_3N_4/ZrO_2$ composites containing a sufficient amount of $Y_2O_3$, of at least about 3 m/O based on $ZrO_2$.

From the foregoing, it is seen that according to the invention, the formation of undesirable Zr-oxynitride, in the reaction between $Si_3N_4$ and $ZrO_2$ for the production of $Si_3N_4/ZrO_2$ composites, can be prevented by incorporation of a sufficient amount of $Y_2O_3$, or equivalent substance described above, as additive, particularly in the form of a solid solution with $ZrO_2$. Composites formed with $Si_3N_4$ and $ZrO_2$ containing $Y_2O_3$ or its equivalent, in sufficient amount, result in formation of tetragonal $ZrO_2$ which is believed to be the agent which significantly increases fracture toughness, to produce transformation toughened $Si_3N_4/ZrO_2$ composites. Composites containing sufficient $Y_2O_3$ or its equivalent are stable in oxidizing environments that would otherwise produce severe degradation of the composite.

As previously noted, the ceramic composites of the invention have utility in the fabrication of Diesel engine components and radomes, and in other structural applications requiring a tough refractory material having low thermal conductivity and high thermal shock and fracture resistance, such as bearings and pump seals.

Since variations and modifications of the invention compositions and process without departing from the invention concept will occur to those skilled in the art, the invention described herein is not to be taken as limited except by the scope of the appended claims.

What is claimed is:

1. A composition for producing low thermal conductivity and high fracture toughness $Si_3N_4/ZrO_2$ composite ceramics substantially free of Zr-oxynitride by sintering, which comprises a mixture of about 50 to about 80% $Si_3N_4$, 20 to about 50% $ZrO_2$ (by volume), and $Y_2O_3$ as additive in an amount from about 3 to about 7 mole % based on $ZrO_2$, sufficient to prevent formation of Zr-oxynitride during sintering.

2. The composition of claim 1, said $ZrO_2$ and $Y_2O_3$ being present in the form of a solid solution.

3. The composition of claim 1, including a sintering aid in an amount sufficient to permit pressureless sintering of said mixture.

4. The composition of claim 3, said sintering aid being $Al_2O_3$ in an amount of about 1 to about 8% by weight of the total mixture.

5. The composition of claim 4, said $ZrO_2$ and $Y_2O_3$ being pre-reacted to form a solid solution, and including $Al_2O_3$ as sintering aid in an amount of about 2 to about 4% by weight of the mixture, to permit pressureless sintering of said mixture.

6. The composition of claim 3, including MgO or CaO as sintering aid in an amount of about 1 to about 8% by weight of the mixture.

7. A low thermal conductivity and high fracture toughness $Si_3N_4/ZrO_2$ composite substantially free of Zr-oxynitride and produced by sintering the composition of claim 1, said composite containing the tetragonal $ZrO_2$ structure and having a fracture toughness such that the composite is substantially free of surface spalling.

8. A low thermal conductivity and high fracture toughness $Si_3N_4/ZrO_2$ composite substantially free of Zr-oxynitride and produced by sintering the composition of claim 2.

9. A low thermal conductivity and high fracture toughness $Si_3N_4/ZrO_2$ composite substantially free of Zr-oxynitride and produced by sintering the composition of claim 4.

10. A low thermal conductivity and high fracture toughness $Si_3N_4/ZrO_2$ composite substantially free of Zr-oxynitride and produced by sintering the composition of claim 5, said composition containing the tetragonal $ZrO_2$ structure and having a fracture toughness such that the composite is substantially free of surface spalling.

11. A composition for producing low thermal conductivity and high fracture toughness $Si_3N_4/ZrO_2$ composite ceramic substantially free of Zr-oxynitride, by sintering, which comprises in volume % a mixture of about 50 to 80% $Si_3N_4$, 20 to 50% $ZrO_2$ and an additive selected from the group consisting of $Y_2O_3$, MgO, CaO, $TiO_2$ and the oxides of the rare earth elements 58–71 of the periodic Table, and mixtures thereof, said additive being present in an amount based on $ZrO_2$, from about 3 to about 7 mole % for $Y_2O_3$, from about 5 to about 18 mole % for MgO or CaO from about 15 to about 35 mole % for $TiO_2$ and from about 9 to about 20 mole % for oxides of rare earth elements, sufficient to prevent formation of Zr-oxynitride during sintering.

12. The composition of claim 11, including a sintering aid in an amount sufficient to permit pressureless sintering of said mixture.

13. A process for producing low thermal conductivity and high fracture toughness $Si_3N_4/ZrO_2$ composite ceramic substantially free of Zr-oxynitride which comprises forming a powder mixture of about 50 to 80% $Si_3N_4$, 20 to 50% $ZrO_2$ (by volume) and $Y_2O_3$, and sintering said mixture, said $Y_2O_3$ being present in an amount from about 3 to about 7 mole %, based on $ZrO_2$, sufficient to prevent formation of Zr-oxynitride during sintering.

14. The process of claim 13, including
forming an aqueous dispersion of said $Si_3N_4$,
forming an aqueous dispersion of said $ZrO_2$ containing said $Y_2O_3$,
mixing said dispersions to form a single slurry,
filtering said single slurry,
drying the resulting filtered powder, and
sintering said powder to form a sintered composite substantially free of Zr-oxynitride.

15. The process of claim 13, said $ZrO_2$ and $Y_2O_3$ being pre-reacted to form a solid solution.

16. The process of claim 13, said mixture including a sintering aid in an amount sufficient to permit pressureless sintering of said mixture.

17. The process of claim 16, said sintering aid being $Al_2O_3$ in an amount of about 1 to about 8% by weight of the total mixture.

18. The process of claim 17, including
forming an aqueous dispersion of said $Si_3N_4$,
forming an aqueous dispersion of said $ZrO_2$ containing said $Y_2O_3$, and
forming an aqueous dispersion of said $Al_2O_3$,
adjusting the pH of each of said aqueous dispersions to provide uniform suspensions,
floccing said dispersions to prevent mass segregation,
mixing the aqueous dispersions to provide the aforementioned proportions of $Si_3N_4$, $ZrO_2$, $Y_2O_3$ and $Al_2O_3$,
filtering the resulting single slurry,
drying the composite powder residue, and
sintering said powder to form a sintered composite substantially free of Zr-oxynitride.

* * * * *